United States Patent [19]

Dudeck

[11] Patent Number: 4,713,907

[45] Date of Patent: Dec. 22, 1987

[54] UPRIGHT JIG

[75] Inventor: David H. Dudeck, White Bear Lake, Minn.

[73] Assignee: Heron Manufacturing, Inc., Little Canada, Minn.

[21] Appl. No.: 43,867

[22] Filed: Apr. 29, 1987

[51] Int. Cl.⁴ ............................................... A01K 85/00
[52] U.S. Cl. .................................... 43/42.39; 43/44.81
[58] Field of Search ............................ 43/42.39, 44.81

[56] References Cited

U.S. PATENT DOCUMENTS

| 497,962 | 5/1893 | D'Ivernois | 43/44.81 |
| 2,589,007 | 3/1952 | Landon | 43/42.39 |
| 3,729,850 | 5/1973 | Waters | 43/42.39 |
| 3,803,747 | 4/1974 | Cartwright | 43/44.81 |

FOREIGN PATENT DOCUMENTS 649385  5/1979  U.S.S.R. .............................. 43/44.81

Primary Examiner—M Jordan
Attorney, Agent, or Firm—Kinney & Lange

[57] ABSTRACT

A jig with a hook means having an orienting body, a substantial mass and selected shape extending below the eye of the hook.

12 Claims, 8 Drawing Figures

UPRIGHT JIG

BACKGROUND OF THE INVENTION

The present invention relates to a fishing device used with a bait to attract and capture fish, and more particularly, to a fishing device for use in jigging.

Jigging is a method of fishing in which the fisherman repeatedly lifts his fishing line, usually by lifting a fishing rod, to move a bait holding device, a jig, up a short distance from the bottom of the body of water being fished in, this action being followed by allowing the jigging device to settle again to the bottom. These actions are usually done repeatedly while the boat carrying the fisherman is allowed to drift freely, or while the boat is propelled at a slow speed. Such repeated lifting and settling actions by the fisherman provide a movement to a bait attached to the jig device which has proved to attract fish and causing them to bite on the bait held in the jigging device. Such a biting fish can then be hooked, thereby capturing it to be brought into possession of the fisherman.

Such action, however, can also cause the bait attached to the fishing device to be dragged along the bottom of the body of water to its detriment. Further, such actions can make it more likely that weeds, sunken objects or rocks will be snagged by the hook in the jigging device which may end with the bait or the jigging device, or both, being lost to the fisherman. Thus, a jigging device is desired which will avoid, to a considerable degree, such results.

SUMMARY OF THE INVENTION

The present invention provides a fishhook means having an orienting body of a substantial mass extending below the eye of the fishhook to which a fishing line arrangement would be attached. The orienting body angles away from the fishhook shaft and is elongated in an angular range with respect to the fishhook shaft. The orienting body has an ellipsoid-like cross section to where it angles away from the fishhook means and, in a portion attached to the hook, has an ellipsoid-like cross section tending to a circle-like cross section further from the angle.

DETAILED DESCRIPTION OF THE PREFERRED EMBODIMENTS

Figure 1:
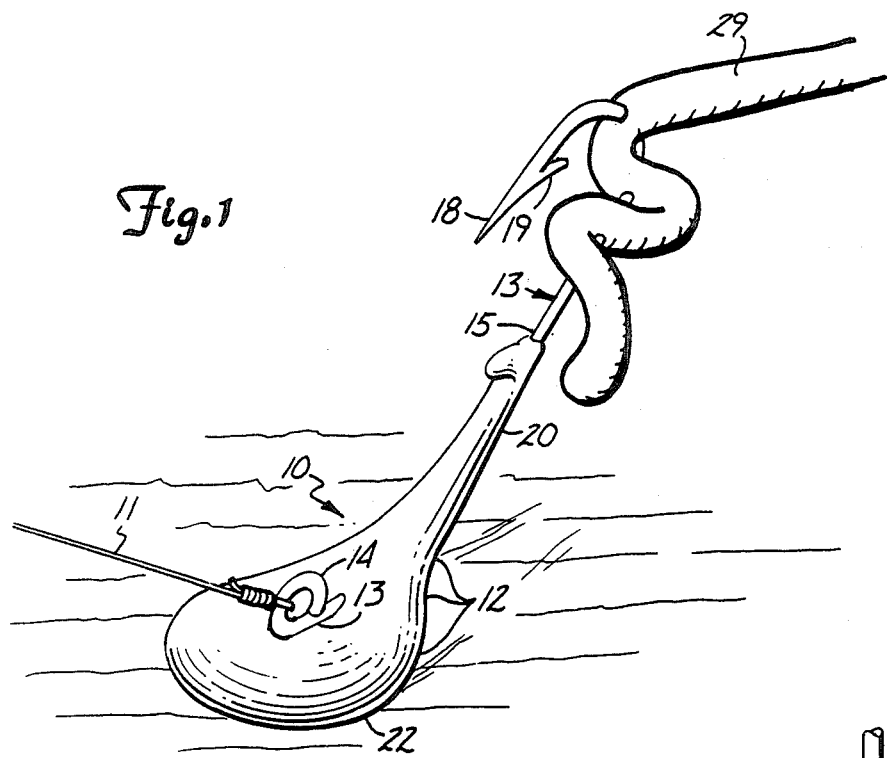
FIG. 1 shows a pictorial view of the present invention as it might appear in use.

FIG. 1 shows a view of a jig device, 10, embodying the present invention in use near the bottom of a body of water being fished by a fisherman. The fisherman has control of jig device 10 through a fishing line, 11, attached thereto. Jig device 10 has an orienting body, 12, formed about a fishhook arrangement, 13. Some of these features are better seen in FIGS. 2, 3 and 4.

Figure 4:
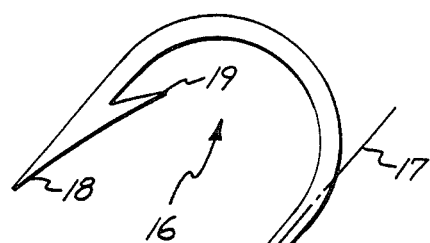
FIG. 4 shows a cross-sectional view of the present invention.

As can be seen in FIG. 4, fishhook 13 has an eye, 14, at one end thereof joined to a shank arrangement, 15, which is joined to a hooking portion, 16. Hooking portion 16 curves around away from a major axis, 17, of shank 15 to bend back toward eye 14, but well short of meeting eye 14, hooking portion 16 ending in a point, 18, with a barb, 19, thereby. Note that a minor portion of shank 15 is bent away from shank major axis 17 near eye 14, but the eye and this lower portion of shank 15 are together joined with hooking portion 16 along the major part of shank 15 through which major axis 17 extends.

Orienting body 12 is formed partly about fishhook 13 around shank 15 thereof but extends below eye 14 and shank 15 oppositely from hooking portion 16. Orienting body 12 may be conveniently considered to comprise two primary portions, although these portions need not necessarily be separated or in any way clearly physically divided in any way from one another.

Thus, consider that portion of orienting body 12 which is oriented along shank major axis 17 to be one portion of orienting body 12 and designated as a connecting portion, 20, of that body. The remaining portion of orienting body 12 is formed more or less symmetrically about a plane, 21, seen on edge in FIG. 4. This other portion primarily extends below eye 14 and the rest of fishhook 13, and appears to support these other portions in FIG. 4, and so is designated as a platform portion, 22, of orienting body 12. Platform portion 22 has by far the greater mass of the platform and connecting portions of orienting body 12, and nearly all of that is concentrated past eye 14 and shank 15 opposite from that end of shank 15 joined with hooking portion 16 along major axis 17 in fishhook 13.

As can be seen, major axis 17 is an imaginary line about which the major portion of shank 15 is concentric, this axis intersecting and passing through plane 21 at an angle other than a right angle. A typical angle measured in the plane formed by shank 15 and eye 14 would be 120° for the angle marked 23 on FIG. 4. The opposite angle, designated 24 in FIG. 4, would be, of course, approximately 60°.

The bisecting plane, 25, of intersection angle 23 passing through orienting body 12 at the vertex of this angle can be taken as approximately where the connecting portion 20 and platform portion 22 are joined thereby forming an intersection in orienting body 12. Therefore, a body intersection where connecting portion 20 is joined with platform portion 22 can be taken as occurring more or less along plane 25. However, there need be no demarcation of any sort between these portions, with one blending smoothly into the other.

Figure 2:
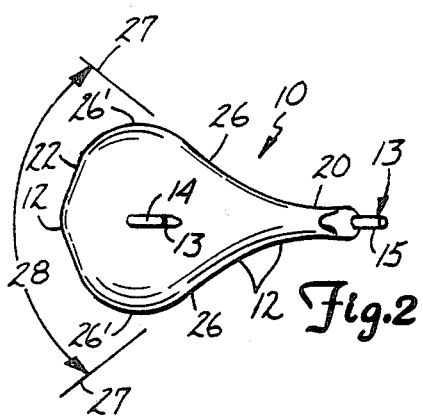
FIG. 2 shows a top view of the present invention.
Figure 3:
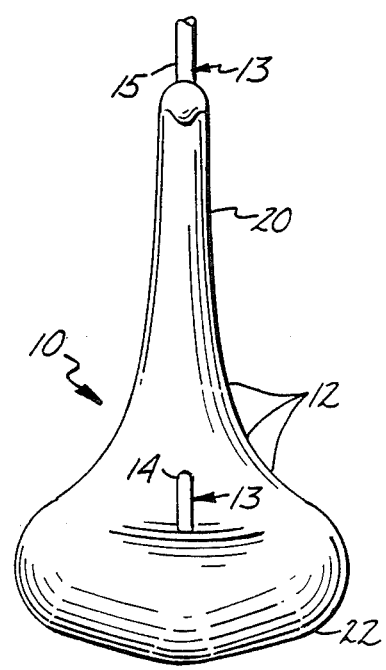
FIG. 3 shows a front view of the present invention.

The view in FIG. 2, which is taken in a direction perpendicular to plane 21, shows that platform portion 22 has sides, 26, near the body intersection which lie substantially along radii, 27, drawn from a point in plane 21 which generally would be to the right of the point axis 17 intersects in plane 21. Thus, in plane 21, substantially all of platform portion 22 extends into and lies in an angular range, 28, contained in the smaller angle between radii 27. Platform body portion 22 does not extend to any significant extent into the angular range defined by the larger angle between radii 27.

Sides 26, at locations more remote from the intersection of connecting portion 20 and platform portion 22, curve toward one another in FIG. 2 and away from radii 27 before reaching the lefthand end of platform portion 22 in that figure. These further side portions, after such curving away from radii 27, are designated 26' in FIG. 2 and are approximately parallel to one another for some distance before reaching this lefthand end of platform portion 22.

Figure 5A:
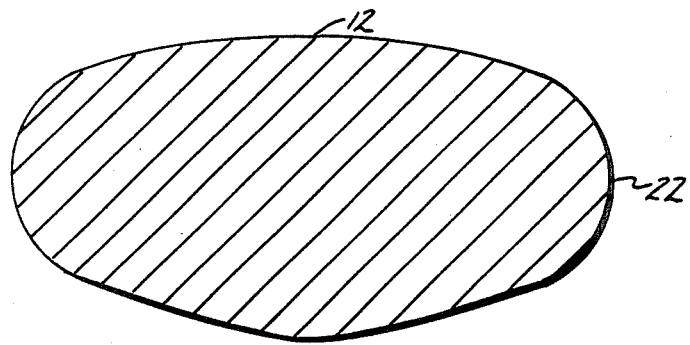
FIGS. 5A and 5B show cross-sectional views of a portion of the present invention.
Figure 5B:
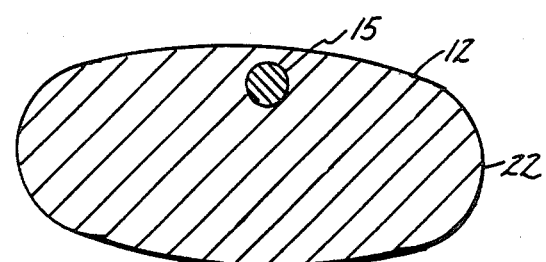
Figure 6A:
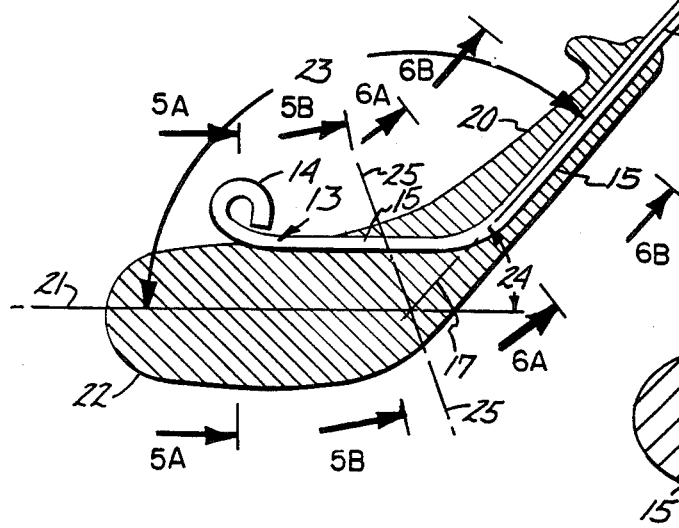
FIGS. 6A and 6B show cross-sectional views of another portion of the present invention.
Figure 6A:
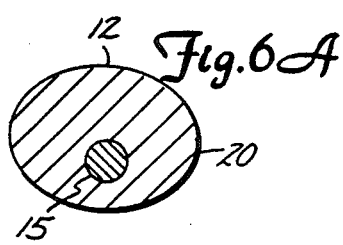
Figure 6B:
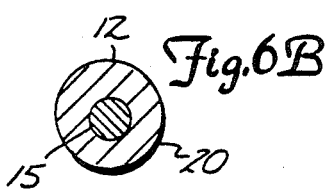

Cross section views taken of FIG. 4, assuming that jigging device 10 was fully present in that figure, are shown in FIGS. 5A and 5B for platform portion 22, and in FIGS. 6A and 6B for connecting portion 20. As can be seen in FIGS. 5A and 5B, the cross section view of platform portion 22 to the left of eye 14 in FIG. 4 is an ellipsoid-like figure, as it is for the cross section in FIG. 5B to the right of eye 14 near the body intersection at plane 25. However, because sides 26 lie along radii, as indicated above, and therefore come closer together as one approaches the body intersection near plane 25, the ellipsoid of FIG. 5B has smaller dimensions than that of FIG. 5A.

Once past the body intersection near plane 25 and into connecting body portion 20, the cross section view shown in FIG. 6A remains ellipsoid-like but of considerably smaller dimensions, and is much less eccentric becoming rather more circle-like. Well up connecting portion 20 from body intersection about plane 25, the cross section shown in FIG. 6B becomes very close to being circle-like with yet again smaller dimensions. These curved side shapes, or curved orienting body 12 outline shapes, coupled with the mass of the platform body being beneath eye 14 lead to gravity acting to keep hooking portion 16 upright above platform portion 22.

This result is further aided in coming about in water by the presence of a bait on hooking portion 16. A possible bait, 29, is shown in FIG. 1 impaled on fishhook 13. The bouyant force resulting from the use of such a bait on fishhook 13 is a further aid in keeping hooking portion 16 above platform portion 22 in water. Both of these forces, the direct gravitational force on orienting body 12 supplemented by the shape thereof, and the bouyant force of bait 29, thus tend to keep hooking portion 16 upright and away from the bottom of the body of water being fished. This reduces wear and tear on bait 29, and reduces the chances of point 18 of hooking portion 16 engaging weeds, rocks or debris occurring along the lake bottom.

The shape of orienting body 12 also contributes to its dynamic behavior in water. Pulling upward on line 11 to raise jigging device 10 a short distance after it has been at rest in water followed by relaxing the tension line 11 leads to jigging device 10 going through a proximately circular loop in the water above its resting place at the beginning of the pull on line 11 to return to near that same place. This result comes about because of the mass distribution in jigging device 10 and the shape of orienting body 12.

Further, if jigging device 10 at the end of a fishing line is cast by the fisherman out into a body of water and retrieved a distance by the fisherman, jigging device 10 exhibits an erratic back-and-forth from left to right, and vice versa in a darting movement action. Again, this is due to the mass distribution in jigging device 10 and the shape or orienting body 12. Jigging device 10 will exhibit a swimming-like action, then, in moving water.

Jigging device 10 can be used with many types of live bait such as worms, leeches or minnows. Various artificial baits, such as those formed in soft plastic, can also be used with it. The rate at which changes of depth can be achieved can be selected by the amount of material used in orienting body 12, increasing the mass of orienting body 12 to more quickly reach deeper depths. Thus, jigging device 10 can be made in a series of sizes for orienting body 12, and while different hook sizes could also be used, a single hook size with the various sizes of orienting body 12 is also quite feasible.

Although the present invention has been described with reference to preferred embodiments, workers skilled in the art will recognize that changes may be made in form and detail without departing from the spirit and scope of the invention.

What is claimed is:

1. A fishing jig comprising:
   a fishhook means having a shank with an eye at one end thereof and joined oppositely from said eye along a major axis thereof to a hooking portion that substantially curves about toward said eye to end in a point;
   an orienting body of a mass greater than that of said fishhook means affixed to said shank by a connection portion of said orienting body to extend past, though leaving exposed, said eye so that most of said mass of said orienting body is located in a platform portion thereat on that side of said eye opposite said hooking portion where joined with said shank, said orienting body connection portion being joined with said orienting body platform portion at a body intersection, said platform portion being arranged substantially about a reference plane which reference plane is intersected by said shank major axis in passing through said reference plane at an intersection angle which is other than a right angle, and said platform portion, in being so arranged, extends substantially radially outward along said reference plane from said body intersection relatively far in a single selected first angular range as compared to its radial extent in said reference plane in a second angular range which includes those angles outside said first angular range with sides of said platform portion, where intersected by said reference plane, lying substantially along radii at least near said body intersection.

2. The apparatus of claim 1 wherein said sides of said orienting body platform portion, where intersected by said reference plane, curve toward one another from lying along radii in parts of said platform portion more remote from said body intersection before coming to that end of said platform portion opposite said body intersection.

3. The apparatus of claim 1 wherein said orienting body platform portion has ellipsoid-like cross sections substantially perpendicular to said reference plane, and said orienting body connection portion has ellipsoid-like cross sections near said body intersection substantially perpendicular to said shank major axis but said cross sections becoming more circle-like further away from said body intersection, said orienting body platform portion blending smoothly into said orienting body connection portion, said orienting body connection portion smoothly blending from said ellipsoid-like cross sections to said more circle-like cross sections.

4. The apparatus of claim 1 wherein said eye is provided at a surface of said orienting body platform portion.

5. The apparatus of claim 1 wherein said intersection angle is approximately one hundred twenty degrees.

6. The apparatus of claim 3 wherein said ellipsoid-like cross sections of said orienting body platform portion near said body intersection shrink in size as said body intersection is more closely approached.

7. The apparatus of claim 2 wherein said sides of said orienting body platform portion are substantially parallel for a distance after curving toward one another, as aforesaid, before reaching that end of said platform portion opposite said body intersection.

8. The apparatus of claim 3 wherein ellipsoid-like cross sections of said orienting body connection portion near said body intersection shrink in size as said body intersection recedes.

9. The apparatus of claim 1 wherein said sides of said orienting body platform portion, where intersected by said reference plane, curve toward one another from lying along radii in parts of said platform portion more remote from said body intersection before coming to that end of said platform portion opposite said body intersection.

10. The apparatus of claim 6 wherein ellipsoid-like cross sections of said orienting body connection portion near said body intersection shrink in size as said body intersection recedes.

11. The apparatus of claim 9 wherein said sides of said orienting body platform portion are substantially parallel for a distance after curving toward one another, as aforesaid, before reaching that end of said platform portion opposite said body intersection.

12. The apparatus of claim 10 wherein said intersection angle is approximately one hundred twenty degrees.

* * * * *